Figure 1:
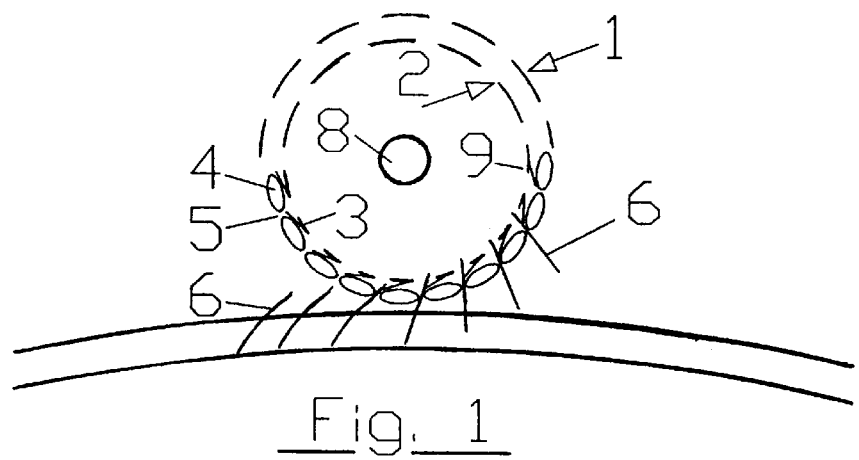

United States Patent

Larsen

[11] Patent Number: 5,904,616
[45] Date of Patent: May 18, 1999

[54] DEVICE FOR REMOVING BONES, ESPECIALLY FISHBONES

[76] Inventor: Espen Welin Larsen, Krognessyeien 7, N-9006 Tromsø, Norway

[21] Appl. No.: 09/068,735
[22] PCT Filed: Nov. 18, 1996
[86] PCT No.: PCT/NO96/00272
　§ 371 Date: May 15, 1998
　§ 102(e) Date: May 15, 1998
[87] PCT Pub. No.: WO97/18717
　PCT Pub. Date: May 29, 1997

[30] Foreign Application Priority Data

Nov. 17, 1995 [NO] Norway ..................... 954653

[51] Int. Cl.⁶ .................................. A22C 25/16
[52] U.S. Cl. .......................... 452/135; 452/137
[58] Field of Search ................... 452/135, 137, 452/138, 83, 84, 85

[56] References Cited

U.S. PATENT DOCUMENTS

| | | | |
|---|---|---|---|
| 3,911,530 | 10/1975 | Kalfsbeek et al. | 452/83 |
| 4,186,216 | 1/1980 | Roth | 452/140 |
| 5,084,056 | 1/1992 | Ecker et al. | 452/83 |
| 5,135,430 | 8/1992 | Jordan et al. | |
| 5,525,101 | 6/1996 | Söperlind | 452/135 |

FOREIGN PATENT DOCUMENTS

| | | |
|---|---|---|
| 26 41 427 | 5/1977 | Germany . |
| 93.2591 | 9/1993 | Norway . |
| WO 94/10848 | 5/1994 | WIPO . |

Primary Examiner—Willis Little
Attorney, Agent, or Firm—Burns, Doane, Swecker & Mathis LLP

[57] ABSTRACT

A device comprising two rollers (1,2) built of ribs (4,9) whereof one roller (2) may rotate inside the other (1) with a rotational speed which is somewhat larger than the rotational speed of the external roller (1), and where there between the ribs (4,9) may pass bones, e.g. fish bones, is suited for removing such (fish) bones from (fish) meat by rolling the device over the piece of meat from which the bones are to be removed.

10 Claims, 2 Drawing Sheets

DEVICE FOR REMOVING BONES, ESPECIALLY FISHBONES

The present invention concerns a process and a device suited for removing bones from filets of meat, and then especially fishbones from untrimmed or un-deboned filets.

When trimming and deboning fish, and especially raw, smoked or cured fish, e.g. salmon or trout, the ventral ribs often remaining the fish meat or the filet after cleaning and cause problems for further processing and when eating the fish. As an example, when cutting thin slices from smoked or cured salmon or when preparing sushi, it is necessary to use boneless filets as a starting material. The preparation of other types of fish filets also requires that all bones are removed from the fish meat prior to serving.

Previously it was thus customary to remove bones from partially cleaned fish by using pliers, tweezers or other types of deboning tools where each bone is removed separately one by one. Such removal of bones is cumbersome and tedious and has as a consequence that the preparation proceeds slowly and that the product becomes more expensive than if such bones were removed automatically or in a rational manner.

Such a problem situation makes a basis for patent application No. 93.2591 disclosing a device for removing bones from fish. Such a previously known device comprises a stationary housing wherein a drum or a wheel is rotating with respect to the housing. The function of the device resides in the fish bones are to be wedged between the housing and the drum and that the bones are to be pulled out from the meat by the rotation of the drum. However, such a device has proven not to be serviceable in practice, since the fish bones either have a tendency to either to stop the drum by becoming tightly. wedged, or they do not become gripped tightly enough by the drum so that they "slip" back into the meat. Furthermore, it is not sufficiently ensured that the bones fit into a slot in the housing wherein the drum rotates.

Consequently there still exists a need for an improved device for removing fish bones from fish meat and which makes manual removal of bones one by one unnecessary.

For getting hold of the fish bones lying hidden inside the fish meat, the fish meat has previously been scraped with a tool with a sharp edge, e.g. a knife. Thereby the meat around the fish bones will become scraped away or become retracted from the end of the bone so that this protrudes from the piece of meat. Such a scraping of pieces of meat and filets has previously been used in connection with manual removal of bones from fish, as disclosed supra. According to the present invention it is preferred, but not necessary, to pretreat the fish meat in the same way.

According to the present invention it has now been found that an extraction instrument comprising two reciprocally and uni-directionally rotating drums will grip and remove the fish bones from a fish filet in a more reliable and easier way than the device indicated supra. Such a de-boning device will comprises those features which are defined in claim 1 in the present application, and will be especially suited for removing bones from pretreated pieces of fish wherein the pieces of fish are scraped to lay the fish bones open.

Figure 2:
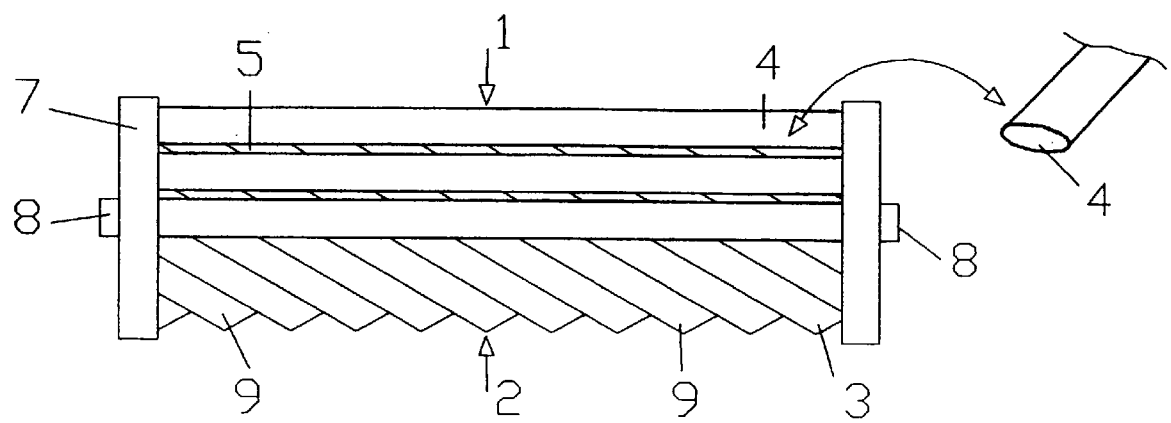
Figure 3:
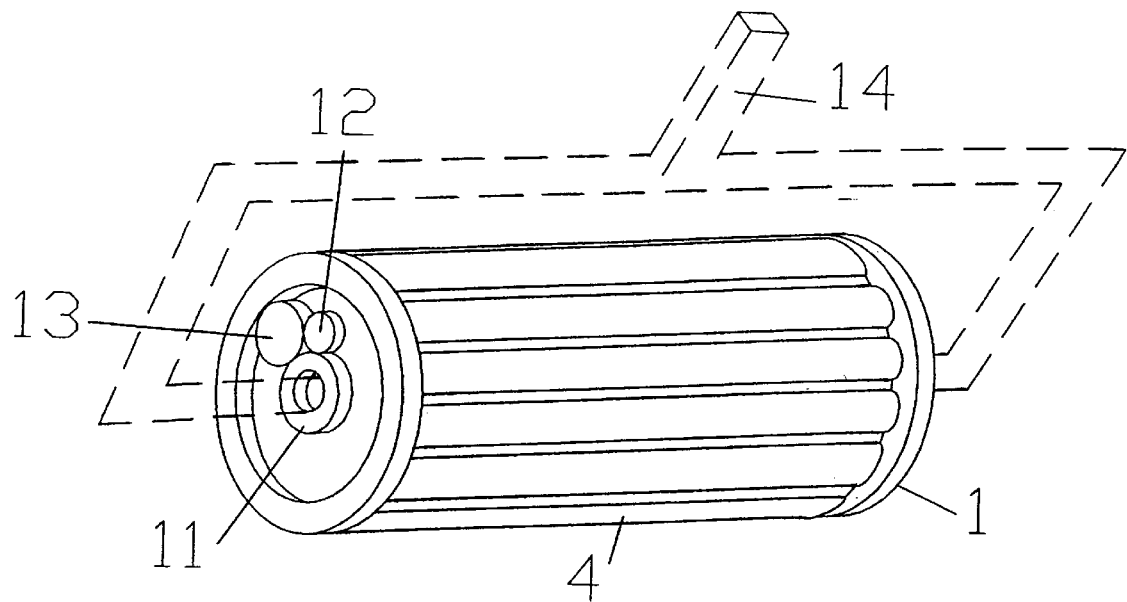
Figure 3:
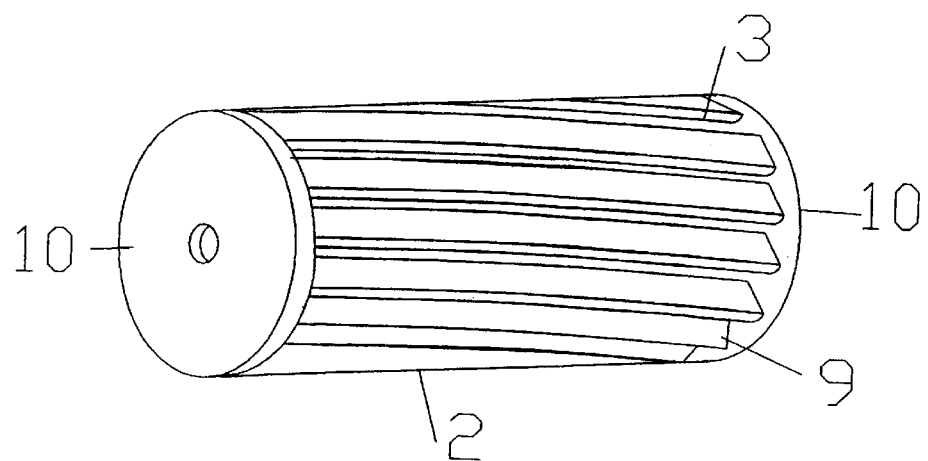

The invention will be described more closely infra with reference to the enclosed figures wherein:

FIG. 1 shows a main view for the design of the device according to the present invention, FIG. 2 shows a sectional view of the device according to the present invention, FIG. 3 shows as an example a design of parts which may be included in the device according to the present invention.

Under reference to the present figures the device according to the present invention comprises two reciprocally rotatable wheels or drums 1,2 wherein the one internal drum 2 may rotate inside the second external drum 1. The rotational direction of both drums is the same, but the rotational speed of the internal drum 2 is somewhat larger than the rotational speed of the outer drum 1. Obviously, the diameter of the internal drum 2 is somewhat smaller than the diameter of the external drum 1. The distance between the drums is normally dictated by the size of the bones to be removed, but it lies preferably within the interval 0.01–5.0 nm at the point of their mutually closest distance from each other.

Both the internal and external drums 1,2 are built of ribs 3,4 which may slide against each other or which have a small reciprocal distance between them. The distance between the ribs 3,4 in the external 1 and the internal 2 drums is normally not so large that fish bones may penetrate between the drums 1,2 and wedge the drums. It may be possible to equip the internal 2 and/or the external 1 drums with regulating devices (not shown) for the diameter of the drum size. Such regulating devices may be tightening screws or tightening devices based on the hose clamp principle. One possibility to regulate the diameter of the internal 2 and/or external 1 drums may e.g. be to produce the drums of an elastic or resilient material, such as a flexible metal (e.g. of aluminum or an aluminum alloy), of plastic or of hard rubber.

The design of the external drum 1 is that it is mainly built of ribs 4 running principally parallel with the rotational axis of the drum. These ribs produce between them open slots or slits 5 between which fish bones 6 may penetrate. The distance between two adjacent ribs may e.g. be in the order of 0.5–20 nm, preferably between 1–5 nm, more preferred between 1–3 nm.

The ribs 4 may have any suitable form. However, it is preferred that they are devoid of sharp edges and that they as an example have an approximately oblong or round cross section (see FIG. 2) since sharp edges in these ribs 4 in the external drum 1 may result in thin fish bones becoming cut and not extracted from the filet.

The ribs 4 in the external drum may pass between and be secured to side walls 7 comprising the side planes of the external drum 1. In these side planes it may also be mounted rotational devices for the internal drum 2 (see disclosure infra). The drum 1 may rotate about an axis 8. The edges of the external drum 1 may also be equipped with a frictional layer (not shown) to ensure the rotation of the external drum 1 about the axis 8.

For hygienical reasons it is preferred that both the external 1 and the internal 2 drums may be disassembled and that the parts may be washed. In such a disassembling it will simultaneously be possible to replace defect or worn parts. It is also preferred that the ribs 4 of the external drum 1 have a smooth surface easing the sliding of the fish bones over the surface of the ribs 4.

The internal drum 2 is also made of ribs 9 running between the two side plates 10. The rotational axis of the internal drum 2 may coincide with the rotational axis 8 of the external drum 1. Alternatively the axis of the internal drum 2 may lie at a location displaced from the rotational axis of the external drum 1. This will create an area between the inner 2 and outer 1 drums in which the fish bones may escape from being gripped between the drums. The outer circumference of the internal drum 2 is somewhat smaller than the inner circumference of the external drum 1 so that the drums may rotate inside each other. The ribs 9 of the internal drum may also run parallel with the rotational axis 8 of the drums, but it is preferred that the ribs are somewhat inclined with respect to this axis 8. The inclination angle between the ribs 9 of the internal drum 2 and the rotational axis 8 will preferably lie in the interval 0–60°, more preferred 0–45°, even more preferred 0–20°. When angling the ribs 9 of the internal drum 2 in such a way, the ribs will pass over a helix surface building the surface of the internal drum 2. The distance between the ribs 9 of the internal drum 2 is also so large that the fish bones may pass between the ribs 9, and the distance between adjacent ribs 9 in the internal drum 2 will preferably lie inside the same interval as the distance between the ribs 4 in the external drum 1.

The material of the ribs of the internal drum 2 is of such a type that it is suited to capture and secure the fish bones 6. Such a material may be a metallic material (e.g. aluminum or an aluminum alloy), a plastic material or a rubber material or a combination thereof.

The function of the bone removing device according to the present invention will be as follows.

Both the internal 1 and the internal 2 drums are driven by the friction between the edges of the external drum 1 and the foundation on which the filet lies. In the side plates 7, 10 of the external 1 and the internal 2 drums, respectively, there is located a gear arrangement comprising sprockets and/or friction-driven wheels (rubber or plastic) making the rotational speed of the internal drum 2 somewhat larger than the external drum 1. The rotational speed of the internal drum 2 is e.g. 0.01–2 times larger than the rotational speed of the external drum 1. This may be achieved by placing an uneven number of frictional wheels or sprockets 11, 12, 13 between the inner edge of the side plates 7 of the external drum 1 (and which internally may be equipped with a corresponding layer of gripping material or teeth) for driving the internal drum 2, wherein the driving wheel for the internal drum may have a rotational axis coinciding with or displaced from the rotational axis for the internal drum 2 (and thus also for the rotational axis for the external drum 1, see FIG. 3). The rotational direction of the external drum 1 is in this case the same as for the internal drum 2. Alternatively, the gear device driving the internal drum 2 with respect to the external drum 1 may have an even number of sprockets or wheels, in which case the rotational direction of the drums 1, 2 will be opposite each other.

By passing (rolling) the external drum 1 over the fish filets (preferably after pretreatment as disclosed supra), the protruding fish bones 6 will slide into the slots between the ribs 4 in the external drum (see FIG. 1). Since the internal drum 2 has a somewhat larger rotational speed that the external drum 1, the bones 6 will be gripped between the surface of the ribs 4 in the external drum 1 and the surface of the ribs 9 in the internal drum 2 and become securely gripped. Thereby the fishbones, now being gripped between the ribs 4, 9 of the external and internal drums 1, 2 will be, by further rotation of the external drum 1, pulled out from their pockets in the fish filets. Since the surfaces of the ribs 4 of the external drum 1 are smooth and the surfaces of the ribs 9 of the internal drum are gripping, the fish bones 6 will become pulled into the inner space of the internal drum 2 by further rotation of the external drum 1 (and thereby also the internal drum 2).

If the fish bones 6 should become wedged between the external 1 and internal 2 drums by such an extraction, the device may firstly, on account of the material of the ribs 9 in the internal drum 2 still be operational, and secondly it will be simple to remove wedged bones by rotating the external drum in the opposite direction.

Furthermore to ease possible removal of wedged bones between the external 1 and internal 2 drums, it will be possible to equip the shaft for the internal drum 2 with a reversing spring (not shown), e.g. a spiral spring, which by removing the external drum from the foundation of the device, returns the internal to its original position. Thereby bones which may be wedged between the internal 2 and external 1 drums will become spit out through the slots between the ribs 4,9.

As a third possibility the axis of the internal 2 and external drums 1 may be somewhat displaced from each other, e.g. making the closest distance between the drums to lie in the interval 0.01–5.0 nm. This will have as an effect that the bones gripped between the drums in the area of their closes distance, may be loosened and released at the area where the drums are at their largest distance from each other.

by this function it will be easily understood why the ribs 9 of the internal drum preferably are angled, since the introduction of the fish bones 6 between the ribs 4 in the external drum 1 and further secure gripping by the ribs 9 in the internal drum 2 thus will be eased.

The device according to the present invention may further be designed as a hand-tool or be included in a production line for filets of fish.

If the device according to the invention is designed as a hand tool, it may be equipped with a handle 14 being shown by a dotted line in FIG. 3.

The device according to the present invention may also be included into a production line for fish products wherein the device may be placed e.g. in connection with a conveyor belt where the filets are passed under the device so that the device rolls over these and removes thereby possibly existing bones being present in the filets. The device according to the invention may also be equipped with a knife in front of the drum collection for thus providing a simultaneous scraping for lifting the bones and removing the bones by passing the device over the filets. Alternatively, the device according to the invention may comprise a motor, e.g. an electromotor, for driving the internal drum 2 and thereby, through the gear arrangement between the internal 2 and external 1 drums, also the external drum 1.

The gear device driving the internal 2 and external 1 drums have been indicated as sprocets or wheels supra, but it may equally well be a device based on a chain or a belt for rotating the drums.

I claim:

1. Device for removing bones, preferably fish bones, from meat, comprising rotatable external and internal drums (2), wherein the rotatable internal drum (2) rotates inside the external drum (1), said drums (1,2) being formed by a number or ribs (4,9), there existing between these ribs (4,9) openings or slots for capturing bones, where the internal drum (2) is equipped with gear devices (11,12,13) connected to and cooperating with the external drum (1) in such a way that the internal drum (2) rotates with a larger speed than the external drum (1).

2. Device according to claim 1, wherein the ribs (4) of the external drum (1) are parallel with the rotational axis (8) of drums (1,2).

3. Device according to claim 1, wherein the ribs (9) of the internal drum (2) lie at an angle, e.g. within the interval 0–60°, preferably within the interval 0–45°, more preferred 0–30°, to the rotational axis (8) of the drums (1,2).

4. Device according to claim 1, wherein the cross section of the ribs (4) of the external drum (1) and/or the ribs (9) of the internal drum (2) have a rounded, e.g. an oblong or round, cross section.

5. Device according to claim 1, wherein the gear devices (11,12,13) are formed of an unequal number frictional wheels and/or sprockets.

6. Device according to claim 1, wherein the rotational speed of the internal drum (2) is 0.01–2 times larger than the rotational speed of the external drum (1).

7. Device according to claim 1, wherein the distance between adjacent ribs (4,9) in each of the drums (1,2) independently from each other, lie in the interval 0.5–20 nm, preferably 1–5 nm, more preferred 1–3 nm.

8. Device according to claim 1, wherein the device is designed as a hand tool with a hoop and a handle (14) for leading the device.

9. Device according to claim 1, wherein the internal drum (2) is equipped with a spring, e.g. a spiral spring, returning the drum (2) to its original position when the load on the external drum (1) is removed.

10. Device according to claim 1, wherein the rotational axis of the internal drum 2 is displaced with respect to the rotational axis of the external drum 1, preferably with a closest distance between the drums in the interval 0.01–5.0 nm.

* * * * *